United States Patent
Yoshiya et al.

(10) Patent No.: US 10,199,974 B2
(45) Date of Patent: Feb. 5, 2019

(54) MOTOR DRIVING CIRCUIT AND MOTOR DRIVING METHOD

(71) Applicant: ROHM CO., LTD., Ukyo-Ku, Kyoto (JP)

(72) Inventors: Takashi Yoshiya, Kyoto (JP); Kyoji Marumoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/380,101

(22) Filed: Dec. 15, 2016

(65) Prior Publication Data
US 2017/0170767 A1    Jun. 15, 2017

(30) Foreign Application Priority Data
Dec. 15, 2015   (JP) .................. 2015-244531

(51) Int. Cl.
| | |
|---|---|
| H02P 6/21 | (2016.01) |
| G11B 21/12 | (2006.01) |
| B62D 5/04 | (2006.01) |
| H02P 23/14 | (2006.01) |
| H02P 6/20 | (2016.01) |
| H02P 27/06 | (2006.01) |
| H02P 6/185 | (2016.01) |

(52) U.S. Cl.
CPC .............. *H02P 23/14* (2013.01); *H02P 6/185* (2013.01); *H02P 6/20* (2013.01); *H02P 27/06* (2013.01)

(58) Field of Classification Search
CPC ........... B62D 5/046; G11B 21/12; H02P 6/21
See application file for complete search history.

(56) References Cited

U.S. PATENT DOCUMENTS

| | | | | |
|---|---|---|---|---|
| 5,982,571 | A | * | 11/1999 | Calfee .................... G11B 21/12 360/70 |
| 6,091,222 | A | * | 7/2000 | Vertemara ................. H02P 6/21 318/254.2 |
| 2009/0190903 | A1 | * | 7/2009 | Komatsu ................ B62D 5/046 388/803 |

(Continued)

FOREIGN PATENT DOCUMENTS

| | | |
|---|---|---|
| JP | 06113585 A | 4/1994 |
| JP | 07177788 A | 7/1995 |
| JP | 2007060899 A | 3/2007 |

*Primary Examiner* — Kawing Chan
*Assistant Examiner* — Cortez Cook
(74) *Attorney, Agent, or Firm* — Cantor Colburn LLP

(57) ABSTRACT

When a motor is started up, an initial position detection circuit detects the initial position of a rotor using an inductive sensing method. An automatic parameter generating circuit determines a parameter to be used by the initial position detection circuit. The automatic parameter generating circuit measures: (i) a first time period $\tau_+$ required for a coil current to reach a threshold after a first polarity voltage is applied across an electrode pair of the motor; and (ii) a second time period $\tau_-$ required for the coil current to reach a threshold after a second polarity voltage is applied across the electrode pair, for each threshold value, while the threshold value used in the measurement is changed. The threshold that provides a maximum difference between the first time period $\tau_+$ and the second time period $\tau_-$ is held as the parameter to be used by the initial position detection circuit.

20 Claims, 7 Drawing Sheets

(56) References Cited

U.S. PATENT DOCUMENTS

2011/0006712 A1* 1/2011 Weissbach .............. G01P 13/04
 318/400.11
2013/0234640 A1* 9/2013 Bateman ................... H02P 6/26
 318/400.35

* cited by examiner

110(106)

MOTOR DRIVING CIRCUIT AND MOTOR DRIVING METHOD

CROSS-REFERENCE TO RELATED APPLICATIONS

This application is based upon and claims the benefit of priority from the prior Japanese Patent Application No. 2015-244531, filed Dec. 15, 2015, the entire contents of which are incorporated herein by reference.

BACKGROUND OF THE INVENTION

1. Field of the Invention

The present invention relates to a motor driving technique.

2. Description of the Related Art

Brushless DC motors are employed in various usages such as spindle motors employed in optical disk devices, HDDs (hard disk drives), office automation equipment, fan motors, and so forth. Such a brushless DC motor has no brush commutation mechanism. Accordingly, with such a brushless DC motor, there is a need to switch the direction of a current to be supplied to a coil according to the position of a rotor. The driving method employed in such a brushless DC motor can be roughly classified into two methods, i.e., a sensor method using rotor position information (Hall signals) obtained from a Hall element or rotary encoder, and a sensorless method without involving such a Hall element in which the rotor position is estimated based on the zero-crossing point of the back electromotive force (inductive voltage) that occurs across the coil.

With the sensor method using a Hall element and an FG magnet, such an arrangement is capable of acquiring the position information not only when the rotor is in a rotating state, but also when the rotor is in a stationary state. However, with the sensorless method, the rotor position is estimated based on the back electromotive force that occurs according to the rotation of the rotor. This leads to a problem in that such an arrangement is not capable of detecting the rotor position with high precision when the motor is in a stationary state or otherwise when the motor is in a low-speed rotating state. In order to solve such a problem, a driving circuit employed with the sensorless method is provided with a function of detecting the position (which will be referred to as the "initial position") of the rotor when the motor is started up.

As such a method for detecting the initial position of the rotor, an inductive sensing method has been proposed. Description thereof will be made as an example regarding a three-phase brushless motor. With such an example, a step voltage is applied across two phase electrodes from among three phase electrodes (U, V, W) while maintaining the rotor in a stationary state. The initial position of the rotor is detected based on the current that flows through the coil in this state. FIG. 1 is a waveform diagram for explaining an operation for detecting the initial position of the rotor using the inductive sensing method. For example, a positive step voltage $V_P$ is applied across the U-phase electrode and the V-phase electrode of the motor. In this state, measurement is performed for the period of time $\tau_{U+}$ required for the coil current $I_U$ that flows through the coil to reach a predetermined threshold current $+I_P$. Next, a negative step voltage $V_N$ is applied across the U-phase electrode and the V-phase electrode of the motor. In this state, measurement is performed for the period of time $\tau_{U-}$ required for the coil current $I_U$ that flows through the coil to reach a predetermined threshold current $-I_P$. The difference $\Delta\tau_U$ between the $\tau_{U+}$ and $\tau_{U-}$ is calculated. The same measurement is performed for a pair of the V-phase electrode and the W-phase electrode and for a pair of the W-phase electrode and the U-phase electrode. As a result, the differences $\Delta\tau_V$ and $\Delta\tau_W$ are calculated. Subsequently, the initial position of the rotor is calculated based on the differences $\Delta\tau_U$, $\Delta\tau_V$, and $\Delta\tau_W$ thus calculated.

As a result of investigating the inductive sensing method, the present inventors have come to recognize the following problem. Before the inductive sensing method is performed as shown in FIG. 1, there is a need to determine appropriate parameters (e.g., threshold currents $\pm I_P$). Specifically, the motor start-up test is performed for each of the initial positions, which are defined at a fine pitch. The parameters are adjusted for each of the initial positions. Specifically, the parameters that provide the highest motor start-up success rate are detected for each of the initial positions. Thus, the inductive sensing method requires a great number of executions of such a motor start-up test. The optimum parameters thus acquired are set for the driving circuit. This imposes a heavy burden on the designer of an electronic device that is to mount such a motor. In some cases, after the parameters to be used in the start-up sequence are optimized before shipping, the parameters thus determined can become unsuitable due to changes in characteristics of the motor with long-term use, leading to the potential for failure in the start-up operation.

Furthermore, as shown in FIG. 1, after the positive step voltage $V_P$ is applied, there is a need to stand by until the coil current $I_U$ becomes zero before the negative step voltage $V_N$ is applied. With conventional techniques, such an arrangement requires a long standby time with a sufficient margin, leading to a problem of a long start-up time.

SUMMARY OF THE INVENTION

The present invention has been made in view of such a situation. Accordingly, it is an exemplary purpose of an embodiment of the present invention to provide a driving circuit that is capable of automatically acquiring optimum parameters used in the inductive sensing method.

An embodiment of the present invention relates to a driving circuit for a brushless DC motor. The driving circuit comprises: a driving signal generating circuit structured to generate a driving signal for each phase; a driving stage structured to drive the brushless DC motor according to the respective phase driving signals; an initial position detection circuit structured to detect an initial position of a rotor using an inductive sensing method when the brushless DC motor is started up; and an automatic parameter generating circuit structured to determine a parameter to be used by the initial position detection circuit. The automatic parameter generating circuit is structured to measure, while a threshold value used in the measurement is changed, a first time period and a second time period for each threshold value. The first time period is a period of time up to a time point at which a coil current reaches the threshold value after the driving stage applies a first polarity voltage across a pair of electrodes of the brushless DC motor. The second time period is a period of time up to a time point at which the coil current reaches the threshold value after the driving stage applies a second polarity voltage across the pair of electrodes. The automatic parameter generating circuit holds the threshold value that provides a maximum difference between the first time period and the second time period, which is to be used as the parameter by the initial position detection circuit.

Another embodiment of the present invention also relates to a driving circuit for a brushless DC motor. The driving circuit comprises: a driving signal generating circuit structured to generate a driving signal for each phase; a driving stage structured to drive the brushless DC motor according to the respective phase driving signals; an initial position detection circuit structured to detect an initial position of a rotor using an inductive sensing method when the brushless DC motor is started up; and an automatic parameter generating circuit structured to determine a parameter to be used by the initial position detection circuit. The automatic parameter generating circuit is structured to measure, while a threshold value used in the measurement is changed, a first time period and a second time period for each threshold value. The first time period is a period of time up to a time point at which a coil current reaches the threshold value after the driving stage applies a first polarity voltage across a pair of electrodes of the brushless DC motor. The second time period is a period of time up to a time point at which the coil current reaches the threshold value after the driving stage applies a second polarity voltage across the pair of electrodes. When a difference between the first time period and the second time period exceeds a predetermined value, the automatic parameter generating circuit holds the threshold value in this stage as the parameter to be used by the initial position detection circuit.

Such embodiments require only a short period of time to acquire the parameter to be used to detect the initial position using the inductive sensing method. Furthermore, such an arrangement allows the parameter to be determined in the same environment as the actual user environment. This provides improved precision.

With an embodiment, the automatic parameter generating circuit may be structured to change the threshold value from a minimum value toward a maximum value. Such an arrangement allows the final threshold value to be reduced as much as possible. This provides a reduction in current consumption required in the start-up operation.

Also, the automatic parameter generating circuit may be structured to determine, based on the threshold value thus held as the parameter, a standby time period, to be provided from a time point at which the first polarity voltage is generated up to a time point at which the second polarity voltage is generated, which is used when the initial position detection circuit detects the initial position of the rotor. Also, the automatic parameter generating circuit may be structured to hold the standby time period as the parameter.

Also, the automatic parameter generating circuit may be structured to switch the electrode pair of the brushless DC motor at least twice. Also, the brushless DC motor may be structured as a three-phase motor. Also, the automatic parameter generating circuit may be structured to switch the electrode pair of the brushless DC motor among three pairs, i.e., a U-V electrode pair, a V-W electrode pair, and a W-U electrode pair. This provides improved precision in the initial position detection.

The driving circuit according to an embodiment may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Yet another embodiment of the present invention relates to an electronic device. The electronic device may comprise: a brushless DC motor; and the driving circuit structured to drive the brushless DC motor.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled with the member B" includes a state in which the member A is indirectly coupled with the member B via another member that does not substantially affect the electrical coupling state therebetween, or that does not damage the functions or effects of the coupling state therebetween, in addition to a state in which the member A is physically and directly coupled with the member B.

Similarly, the state represented by the phrase "the member C is provided between the member A and the member B" includes a state in which the member A is indirectly coupled with the member C, or the member B is indirectly coupled with the member C via another member that does not substantially affect the electrical coupling state therebetween, or that does not damage the functions or effects of the coupling state therebetween, in addition to a state in which the member A is directly coupled with the member C, or the member B is directly coupled with the member C.

Figure 2:
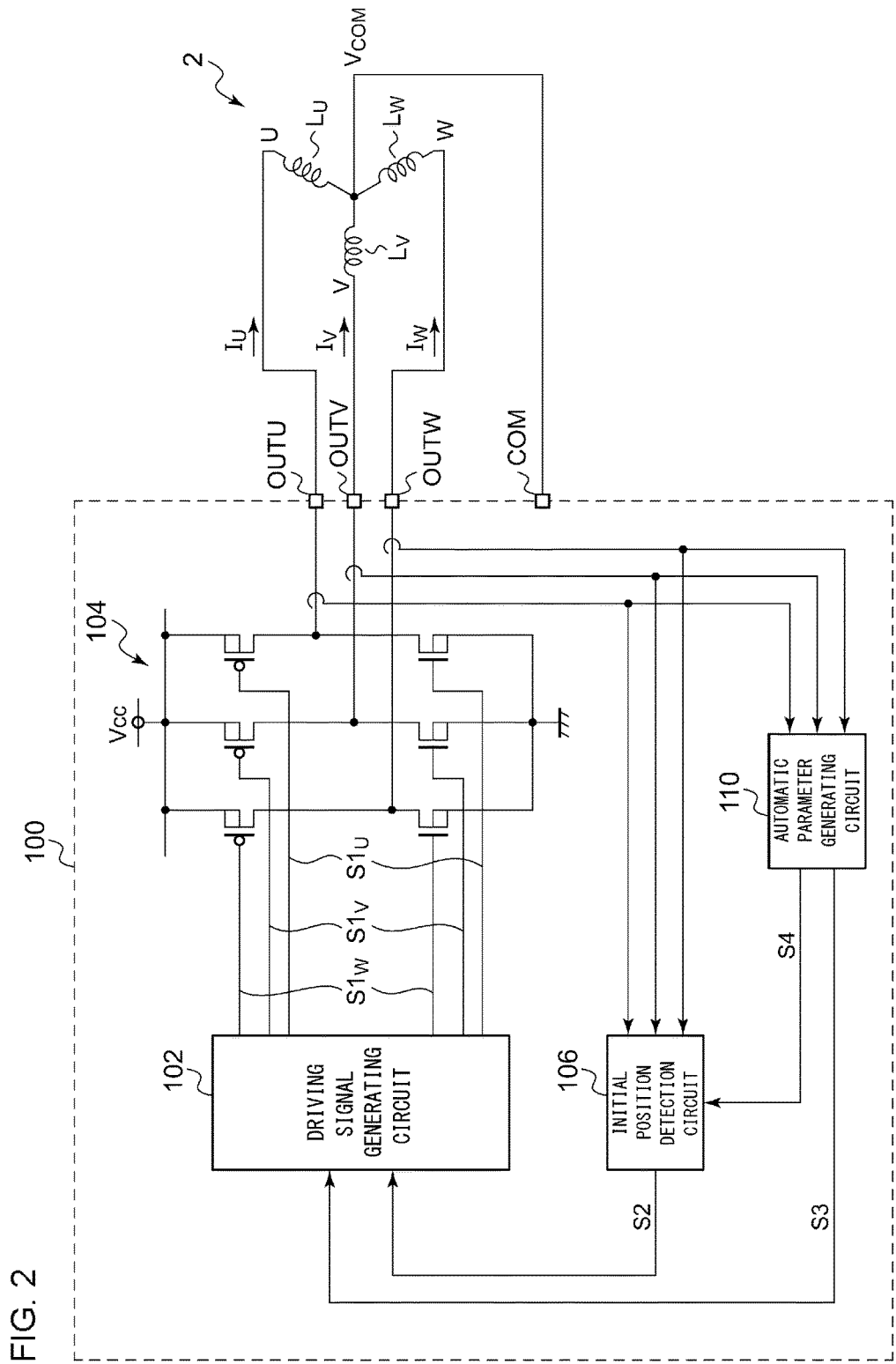
FIG. 2 is a circuit diagram showing a driving circuit according to an embodiment.

FIG. 2 is a circuit diagram showing a driving circuit 100 according to an embodiment. The driving circuit 100 drives a brushless DC motor (which will simply be referred to as the "motor") 2 in a sensorless manner. In the present embodiment, the motor 2 is configured as a three-phase motor having a U-phase coil, a V-phase coil, and a W-phase coil. The motor 2 may be configured as an inner rotor type motor or otherwise an outer rotor type motor. The coils of the motor 2 may be coupled in star-form or otherwise in delta form. The driving circuit 100 includes a driving signal generating circuit 102, a driving stage 104, an initial position detection circuit 106, and an automatic parameter generating circuit 110. The driving circuit 100 is configured as a function IC (Integrated Circuit) monolithically integrated on a single semiconductor substrate. The driving circuit 100 includes a COM terminal that receives the common-mode voltage $V_{COM}$ and output terminals OUTU through OUTW respectively provided to the U-phase coil through the W-phase coil.

The driving signal generating circuit 102 generates a U-phase driving signal $S1_U$, a V-phase driving signal $S1_V$, and a W-phase driving signal $S1_W$. The driving signal generating circuit 102 may be configured using known techniques. For example, the driving signal generating circuit 102 may include a back electromotive force detection comparator that detects the position of a rotor when the motor is in a rotating state, a pulse modulator that generates a pulse signal having a duty ratio that corresponds to the target torque (target rotational speed) to be set for the motor 2, a logic circuit that estimates the position of the rotor based on the output of the back electromotive force detection comparator and that switches the phase to be driven according to the rotor position thus estimated (commutation control operation), and the like. The driving method is not restricted in particular. For example, a 180-degree conduction system or a 120-degree conduction system may be employed. The driving stage 104 is configured as a three-phase inverter. The driving stage 104 drives the motor 2 according to the phase driving signals $S1_U$ through $S1_W$. It should be noted that, in FIG. 2, the driving stage 104 includes a high-side transistor configured as a P-channel MOSFET and a low-side transistor configured as an N-channel MOSFET. However, the present invention is not restricted to such an arrangement. Also, such a high-side transistor may be configured as an N-channel MOSFET. Also, the driving stage 104 may be configured employing other switches such as bipolar transistors or otherwise IGBTs (Insulated Gate Bipolar Transistors), instead of the MOSFETs.

When the motor 2 is started up, the initial position detection circuit 106 estimates the initial position of the rotor using the inductive sensing method described above with reference to FIG. 1. Specifically, the initial position detection circuit 106 supplies a control signal S2 to the driving signal generating circuit 102 so as to apply a step voltage $V_P$ across the U-phase electrode and the V-phase electrode with a first polarity. By turning on the U-phase high-side switch and the V-phase low-side switch and turning off the remaining switches, such an arrangement applies the step voltage $V_P$ across the U-phase electrode and the V-phase electrode with the first polarity. In this state, the initial position detection circuit 106 monitors the U-phase coil current $I_U$, and measures the first time period $\tau_{U+}$ required for the U-phase coil current $I_U$ to reach the threshold value $I_P$.

Subsequently, the initial position detection circuit 106 stands by until the coil current $I_U$ becomes zero. After the coil current $I_U$ becomes zero, the initial position detection circuit 106 supplies the control signal S2 to the driving signal generating circuit 102 so as to apply the step voltage $V_N$ across the U-phase electrode and the V-phase electrode with a second polarity that is opposite to the first polarity. By turning on the U-phase low-side switch and the V-phase high-side switch and turning off the remaining switches, such an arrangement applies the step voltage $V_N$ across the U-phase electrode and the V-phase electrode with the second polarity. In this state, the initial position detection circuit 106 monitors the U-phase coil current $I_U$, and measures the second time period $\tau_{U-}$ required for the U-phase coil current $I_U$ to reach the threshold value $-I_P$.

Figure 1:
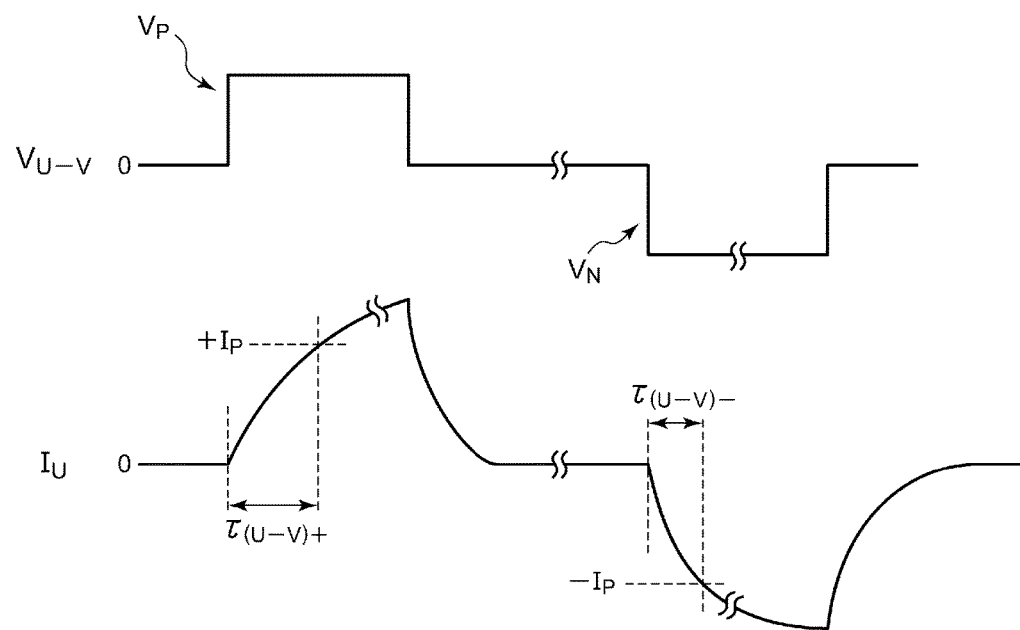
FIG. 1 is a waveform diagram for explaining an initial rotor position detection operation using an inductive sensing method.

The initial position detection circuit 106 performs the same measurement for a pair of the V-phase electrode and the W-phase electrode and for a pair of the W-phase electrode and the U-phase electrode. As a result, the time periods $\tau_{U+}$, $\tau_{U-}$, $\tau_{V+}$, $\tau_{V-}$, $\tau_{W+}$, and $\tau_{W-}$ are obtained. The initial position detection circuit 106 estimates the initial position of the rotor of the motor 2 by calculation or otherwise with reference to a table. The estimation of the initial position may be made using the inductive sensing method as shown in FIG. 1 or various methods disclosed in Patent documents (Japanese Patent Application Laid-Open No. H07-177788, Japanese Patent Application Laid-Open No. H06-113585, Japanese Patent Application Laid Open No. 2007-60899) or other documents. That is to say, in the present invention, the method for estimating the initial position is not restricted in particular.

It should be noted that the current detection method employed in the initial position detection circuit 106 and employed in the automatic parameter generating circuit 110 described below is not restricted in particular. That is to say, known techniques may be employed. For example, a resistor for current detection may be inserted between each phase inverter and the OUT terminal. With such an arrangement, a coil current may be detected based on a voltage drop that occurs at the resistor. Also, such a current detection resistor may be arranged between the ground and a low-voltage side common coupling terminal that couples the three low-side switches of the driving stage 104.

Before the initial position detection circuit 106 estimates the initial position, the initial position detection circuit 106 refers to at least one parameter S4. For example, with the initial position estimating method described above with reference to FIG. 1, the thresholds $\pm I_P$ are employed as the parameters. In a state in which the driving circuit 100 is coupled with the motor 2 to be driven, the automatic parameter generating circuit 110 executes a calibration sequence described later, so as to automatically generate (optimize) the parameter to be used by the initial position detection circuit 106.

Description will be made regarding the calibration sequence. The calibration sequence is performed in a state in which the rotation of the motor 2 has stopped. However, the calibration sequence can be performed regardless of the position of the rotor. The automatic parameter generating circuit 110 measures the first time period $\tau_+$ and the second time period $\tau_-$ for each of the threshold values $I_{Pi}$ (i=1, 2, ...), which are changed in the order $I_{P1}$, $I_{P2}$, $I_{P3}$, ..., $I_{Pi}$.

(i) The first time period $\tau_+$ is a period of time required for the amplitude of the coil current to reach the threshold value $I_{Pi}$ after the driving stage 104 applies the voltage $V_P$ across a pair of electrodes of the motor 2 with the first polarity (positive).

(ii) The second time period $\tau_-$ is a period of time required for the amplitude of the coil current to reach the threshold value $I_{Pi}$ after the driving stage 104 applies the voltage $V_N$ across the pair of electrodes of the motor 2 with the second polarity (negative).

Next, the difference $\Delta\tau_i$ between the first time period $\tau_+$ and the second time period $\tau_-$ is calculated for each threshold value $I_{Pi}$. The threshold value $I_{Pi}$ that provides the maximum time difference $\Delta\tau_1$ is employed and held as the parameter, which is to be used by the initial position detection circuit 106.

Preferably, the automatic parameter generating circuit 110 switches the electrode pair of the motor 2 to which the voltage is to be applied at least twice. With the three-phase motor, there are three electrode pairs, i.e., the U-V electrode pair, the V-W electrode pair, and the W-U electrode pair. The automatic parameter generating circuit 110 preferably measures the first time period $\tau_+$ and the second time period $\tau_-$ while the threshold value $I_P$ used in the measurement is changed, so as to calculate the difference $\Delta\tau_i$ between the first time period $\tau_+$ and the second time period $\tau_-$. This measurement is preferably performed for at least two electrode pairs from among the aforementioned three electrode pairs. Description will be made below regarding an arrangement in which such a measurement is performed for all of the U-V electrode pair, the V-W electrode pair, and the W-U electrode pair.

In order to apply each of the voltages $V_P$ and $V_N$ across an appropriate electrode pair of the motor 2 in the calibration sequence described above, the automatic parameter generating circuit 110 supplies a control signal S3 to the driving signal generating circuit 102.

Figure 3:
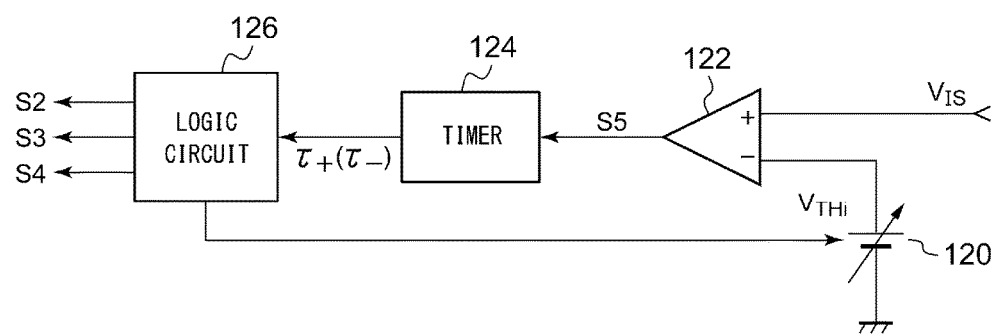
FIG. 3 is a block diagram showing an example configuration of an automatic parameter generating circuit.

FIG. 3 is a block diagram showing an example configuration of the automatic parameter generating circuit 110. The automatic parameter generating circuit 110 includes a variable voltage source 120, a comparator 122, a timer 124, and a logic circuit 126. The variable voltage source 120 generates a threshold voltage $V_{THi}$ that corresponds to the threshold value $I_{Pi}$. The threshold voltage $V_{THi}$ is configured as a variable voltage that can be switched between N levels, i.e., $V_{TH1}$ through $V_{THN}$.

The comparator 122 compares the threshold voltage $V_{THi}$ with a current detection signal $V_{IS}$ that indicates a detection value of the current that flows through the phase coil to be monitored. When the current detection signal $V_{IS}$ matches the threshold voltage $V_{THi}$, i.e., when the coil current reaches the threshold value $I_{Pi}$, the comparator 122 asserts (e.g., set to the high level) the output S5. The timer 124 measures the first time period $\tau_+$ (or second time period $\tau_-$) from the time point at which the first-polarity voltage $V_P$ (or second-polarity voltage $V_N$) is applied up to a time point at which the comparator 122 asserts the output S5. The logic circuit 126 acquires the first time period $\tau_+$ and the second time period $\tau_-$ for each threshold voltage $V_{THi}$ while the threshold voltage $V_{THi}$ used in the measurement is changed.

It should be noted that a large part of the functions of the automatic parameter generating circuit 110 are the same as those of the functions of the initial position detection circuit 106. Accordingly, a part of or all of the hardware components may be shared between the automatic parameter generating circuit 110 and the initial position detection circuit 106. Such an arrangement allows the circuit area to be reduced.

Figure 4:
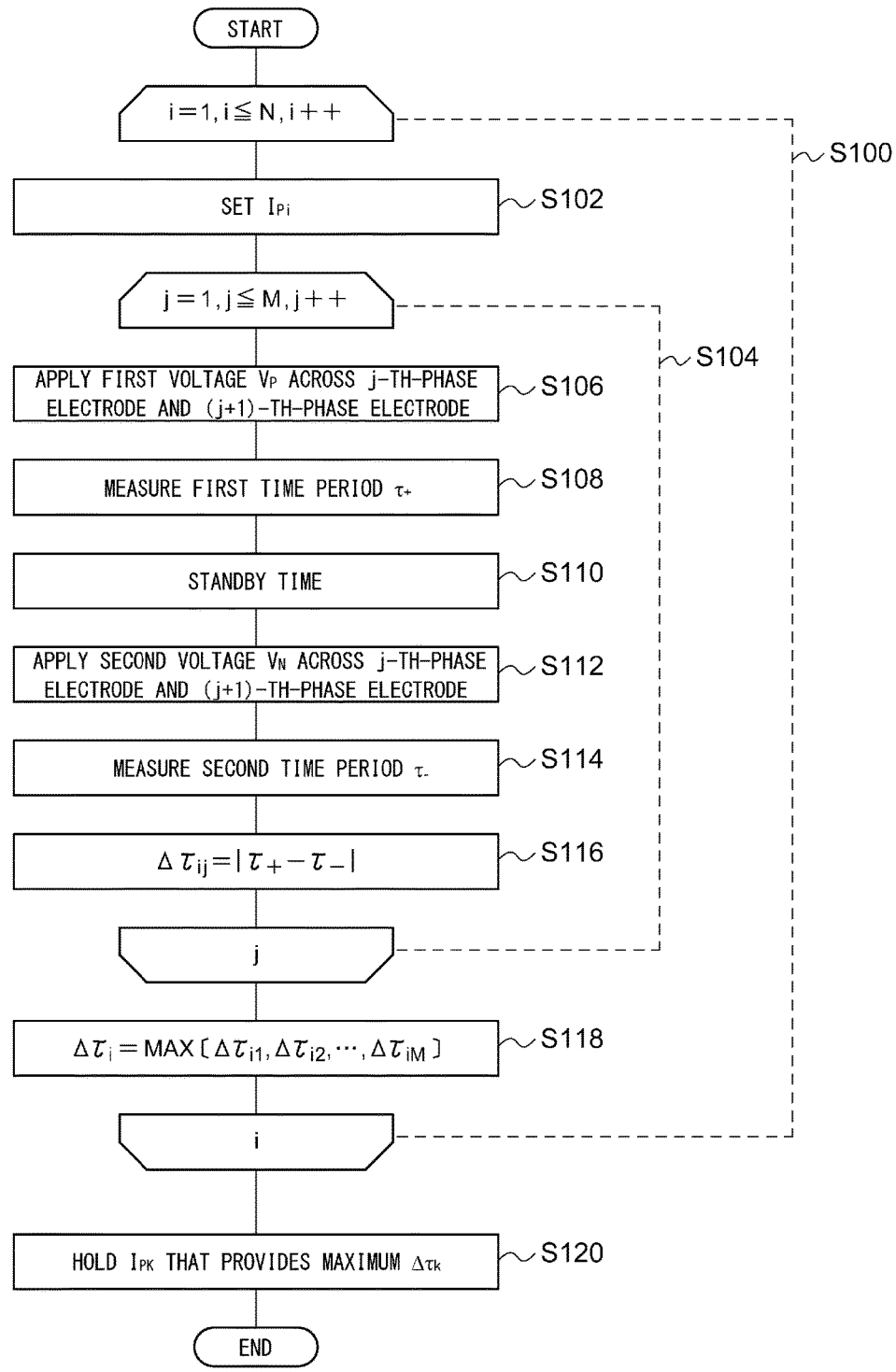
FIG. 4 is a flowchart showing a calibration sequence according to the embodiment.

The above is the configuration of the driving circuit 100. Next, description will be made regarding the operation thereof. FIG. 4 is a flowchart showing the calibration sequence according to the embodiment. A loop S100 is repeatedly executed for a variable i that is changed for every loop from 1 up to N. Here, N represents a constant. First, the threshold value $I_{Pi}$ is set (S102). Subsequently, the loop S104 is repeatedly executed for a variable j that is changed for every loop from 1 to M. The variable j represents the phase. Specifically, j=1 represents the U-phase, j=2 represents the V-phase, and j=3 represents the W-phase. Description will be made below regarding an arrangement in which M=3. Also, an arrangement may be made in which such a calibration sequence is performed for only the U-phase and V-phase, which corresponds to an arrangement in which M=2. In a case in which the motor 2 is configured as a five-phase motor, M is set to a maximum of 5.

In the loop S104, first, the first voltage $V_P$ is applied across the adjacent phase electrodes, i.e., across the j-th-phase electrode and the (j+1)-th-phase electrode (S106). For convenience, when j=3, the (j+1)-th-phase, i.e., the fourth phase, represents the U-phase. In this state, the current that flows through the j-th-phase coil is monitored. Specifically, measurement is performed for the first time period $\tau_+$ up to the time point at which the current reaches the threshold value $I_{Pi}$ (S108). When the current reaches the threshold value $I_{Pi}$, the first voltage $V_P$ is turned off, and zero voltage is applied across the j-th-phase electrode and the (j+1)-th phase electrode. The driving circuit 100 stands by until the coil current becomes zero (S110).

Next, the second voltage $V_N$ is applied across the j-th-phase electrode and the (j+1)-phase electrode (S112). In this state, the current that flows through the j-th-phase coil is monitored. Specifically, measurement is performed for the second time period $\tau_-$ up to the time point at which the current reaches the threshold value $-I_{Pi}$ (S114). When the current reaches the threshold value $-I_{Pi}$, the second voltage $V_N$ is turned off, and zero voltage is applied across the j-phase electrode and the (j+1)-th phase electrode. Next, the difference $\Delta\tau_{ij}$ ($=|\tau_+ - \tau_-|$) between the first time period $\tau_+$ and the second time period $\tau_-$ is calculated. Subsequently, the variable j is incremented for the loop S104. When all the differences $\Delta\tau_{i1}$, $\Delta\tau_{i2}$, and $\Delta\tau_{i3}$ (i.e., $\Delta\tau_{iU}$, $\Delta\tau_{iV}$, and $\Delta\tau_{iW}$) are obtained after the variable j reaches M=3, the loop S104 ends.

Next, the maximum value selected from among $\Delta\tau_{i1}$, $\Delta\tau_{i2}$, and $\Delta\tau_{i3}$ is held as the difference $\Delta\tau_i$ that corresponds to the variable i. MAX[ ] represents a function of selecting the maximum value (S118). Subsequently, the variable i is incremented for the loop S100. When the differences $\Delta\tau_1$, $\Delta\tau_2$, ..., $\Delta\tau_N$ are obtained for all the threshold $I_P$ candidates after the variable i reaches N, the loop S100 ends. With the k-th (1≤k≤N) difference $\Delta\tau_k$ as the maximum difference among the differences $\Delta\tau_1$, $\Delta\tau_2$, ..., $\Delta\tau_N$, the threshold value $I_{PK}$ that corresponds to the maximum difference $\Delta\tau_k$ is held as the parameter.

Figure 5:
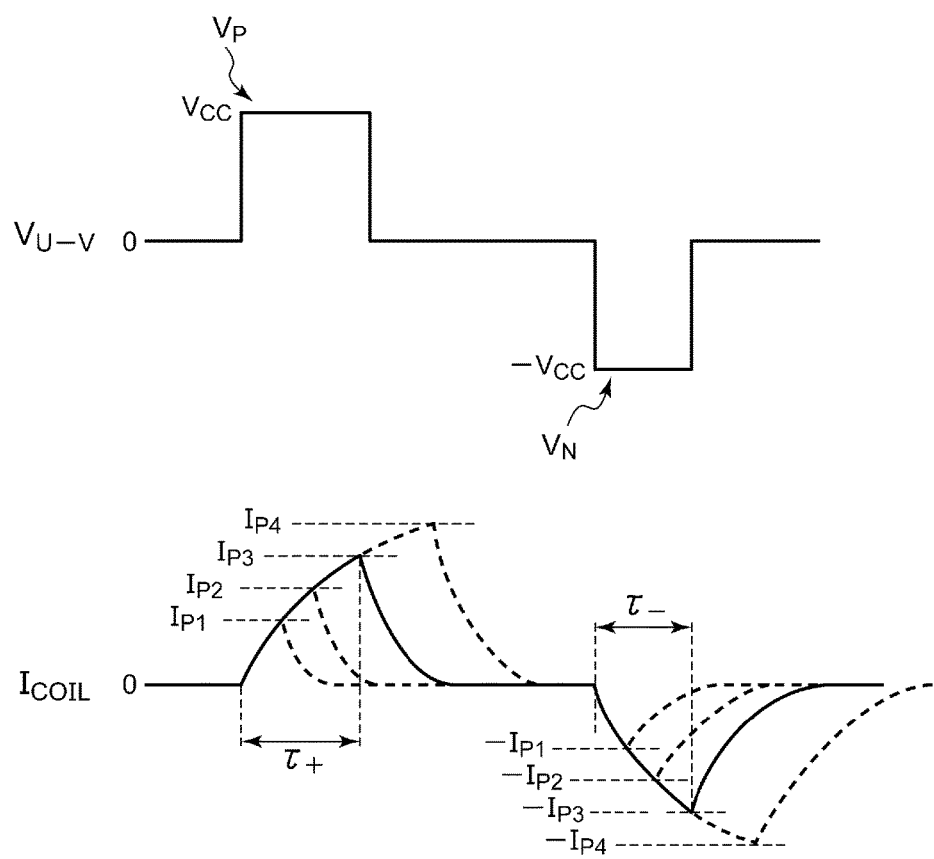
FIG. 5 is a current waveform diagram showing the waveforms in the calibration sequence.

FIG. 5 is a current waveform diagram showing the operation in the calibration sequence. The first time period $\tau_+$ and the second time period $\tau_-$ each change according to a change in the threshold value $I_P$. In the operation in the flowchart shown in FIG. 4, judgment is made so as to select the threshold $I_P$ that provides the maximum difference $\Delta\tau$ between the first time period $\tau_+$ and the second time period $\tau_-$. The threshold $I_P$ thus selected is held as the parameter to be set for the initial position detection circuit 106.

The above is the operation of the driving circuit 100. In an actual user environment, the the driving circuit 100 requires only a short period of time to acquire the parameter $I_P$ to be used in the initial position detection based on the inductive sensing method. That is to say, there is no need to perform a great number of start-up tests before shipping, thereby dramatically reducing the burden on the designer of an electronic device.

Furthermore, such an arrangement is capable of determining the parameter $I_P$ in the same environment as the actual user environment. This allows the initial position detection circuit 106 to detect the position of the rotor of the motor 2 without incurring the effects of variation in the characteristics of the motor 2. This allows the start-up time required for the motor 2 to be reduced as compared with conventional techniques.

The automatic parameter generating circuit 110 can be instructed to operate at a desired timing. This allows the optimum parameter to be acquired even if the characteristics of the motor 2 change with long-term use. For example, the automatic parameter generating circuit 110 may execute the calibration sequence every time the power supply for the driving circuit 100 is turned on.

Also, the automatic parameter generating circuit 110 may execute the calibration sequence every time it receives an instruction from a higher-level processor (microcomputer). In this case, the parameter S4 may be transmitted to the processor, and may be managed and stored on the processor side. Also, the driving circuit 100 may monitor the temperature, and may execute the calibration sequence every time the temperature condition matches a predetermined condition.

As shown in FIG. 5, after the threshold $I_P$ is determined, such an arrangement is capable of estimating a period of time required for the coil current to return to zero, based on the threshold $I_P$ thus determined. As shown in FIG. 1, in a case in which the initial position detection circuit 106 performs the initial position detection, before the negative step voltage $V_N$ is applied, there is a need to provide a stand-by period until the coil current $I_U$ becomes zero after the positive step voltage $V_P$ is applied. With conventional techniques, such an arrangement requires a long stand-by time with a sufficient margin, leading to a problem of a long start-up time. In contrast, with the present embodiment, such an arrangement is capable of supplying a stand-by time period that corresponds to the threshold $I_{PK}$ thus held as a parameter to the initial position detection circuit 106. This allows such a margin to be removed, thereby reducing the period of time required for the initial position detection circuit 106 to detect the initial position.

It should be noted that, in the flowchart shown in FIG. 4, the order of each step may be mutually exchanged or modified as appropriate.

After the second time period $\tau_-$ is measured, the first time period $\tau_+$ may be measured.

Also, the calculation of the difference between the first time period $\tau_+$ and the second time period $\tau_-$ may be performed at once after the measurement ends for all values of i and j.

Also, Step S118 may be omitted. In this case, in Step S120, judgment may be made so as to select the maximum value $\Delta\tau_{kj}$ from among $\Delta\tau_{11}$, $\Delta\tau_{12}$, $\Delta\tau_{13}$, $\Delta\tau_{21}$, $\Delta\tau_{22}$, $\Delta\tau_{23}$, ..., $\Delta\tau_{N1}$, $\Delta\tau_{N2}$, $\Delta\tau_{N3}$, and may hold the corresponding threshold value $I_{PK}$.

Also, the loop S100 with the variable i and the loop S104 with the variable j may be mutually exchanged. That is to say, an arrangement may be made in which the U-phase loop is executed for each changed threshold value in this loop, the V-phase loop is executed for each changed threshold value in this loop, and the W-phase loop is executed for each changed threshold value in this loop.

Description has been made with reference to FIG. 4 regarding an arrangement in which the threshold $I_P$ is changed from the minimum value $I_{P1}$ toward the maximum value $I_{PN}$. Also, an arrangement may be made in which the threshold $I_P$ is changed in the reverse direction, i.e., from the maximum value $I_{PN}$ toward the minimum value $I_{P1}$. In this case, with initial value of the variable i as N in the loop S100, the variable i may preferably be decremented (represented by i—) for every loop.

Figure 6:
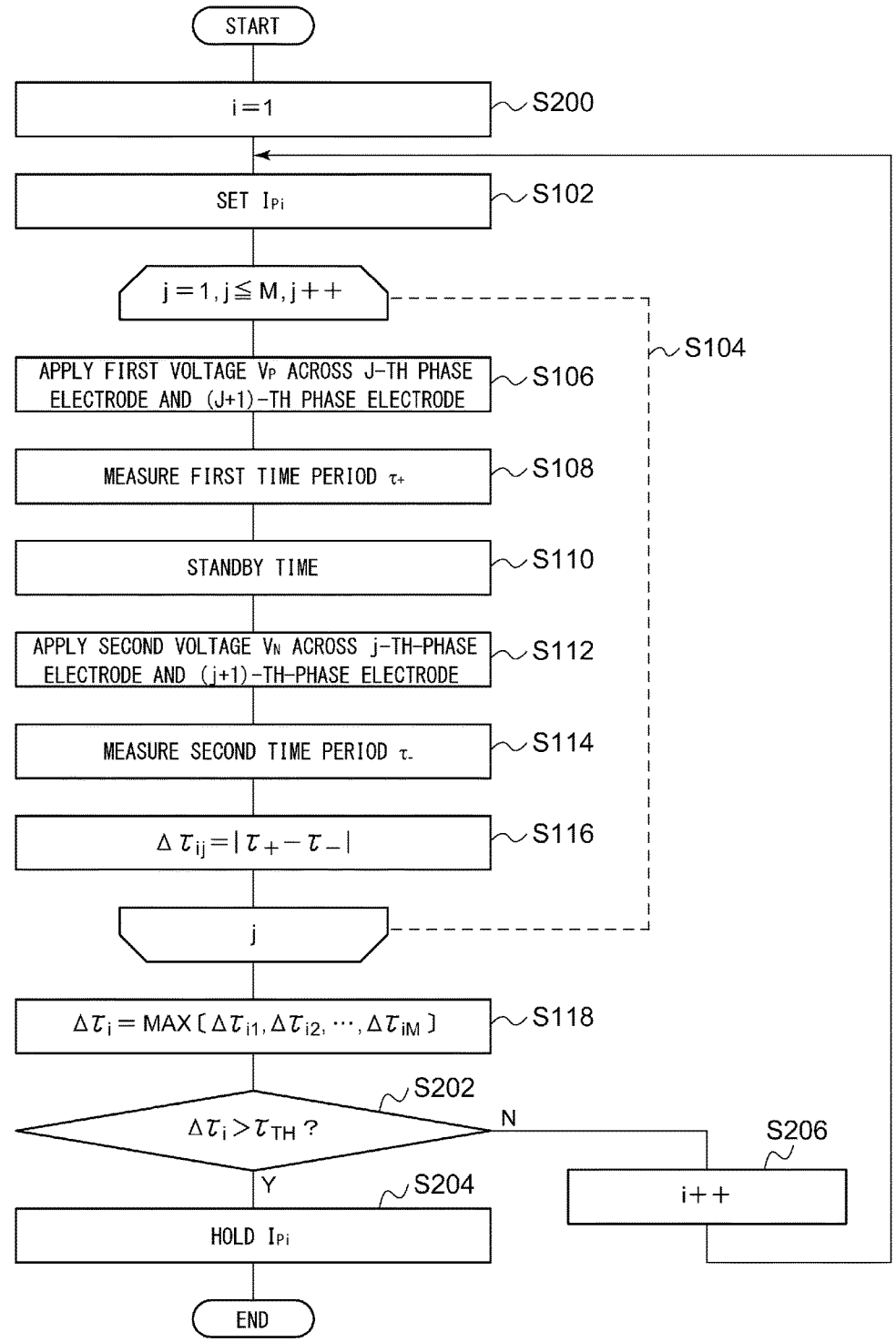
FIG. 6 is a flowchart showing a calibration sequence according to a modification.

Also, the flowchart may be modified as follows. FIG. 6 is a flowchart showing a calibration sequence according to a modification. First, the variable i is initialized to 1. The operations shown in Steps S102 through S118 are the same as those shown in FIG. 4. When the difference $\Delta\tau_i$ is acquired in Step S118, the value of the difference $\Delta\tau_i$ is compared with a predetermined threshold time $\tau_{TH}$ (S202). When the relation $\Delta\tau_i > \tau_{TH}$ holds true (YES in S202), the threshold $I_{Pi}$ that provides $\Delta\tau_i$ is held as the parameter (S204). When the relation $\Delta\tau_i < \Delta\tau_{TH}$ holds true (NO in S202), the variable i is incremented (S206), and the flow returns to Step S102.

In the operation shown in the flowchart in FIG. 6, the loop S100 is not repeatedly performed until the maximum value of the difference $\Delta\tau_i$ is detected. Instead, a sufficiently large threshold time $\tau_{TH}$ is determined. When the difference $\Delta\tau_i$ detected in a given loop is greater than the threshold time $\tau_{TH}$ thus determined, the loop ends, and the threshold $I_{Pi}$ that provides the difference $\Delta\tau_i$ is employed as the parameter. This allows the time required to automatically generate the parameter to be further reduced.

Furthermore, with the operation shown in the flowchart in FIG. 6, such an arrangement allows the threshold $I_{Pi}$ held as the parameter to be reduced as much as possible. Thus, such an arrangement allows the threshold $I_{Pi}$ to be reduced such that it is smaller than the threshold $I_{PK}$ obtained in the flowchart shown in FIG. 4. In this case, in the initial position detection operation of the initial position detection circuit 106, such an arrangement allows the current that flows through the motor 2 to be reduced, thereby providing reduced power consumption. This becomes a marked advantage in a case in which the driving circuit 100 and the motor 2 are mounted on a battery-driven electronic device.

Figure 7A:
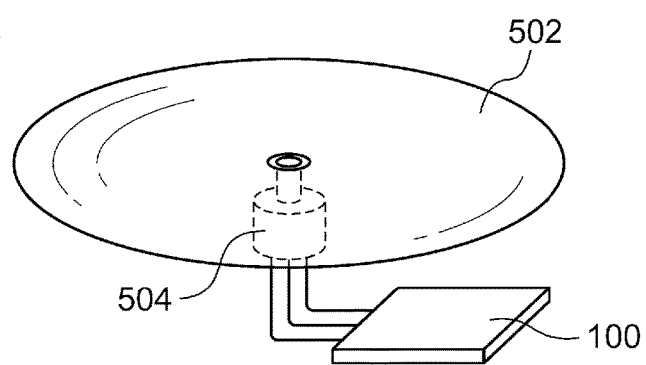
FIGS. 7A and 7B are diagrams each showing an example of an electronic device.
Figure 7B:
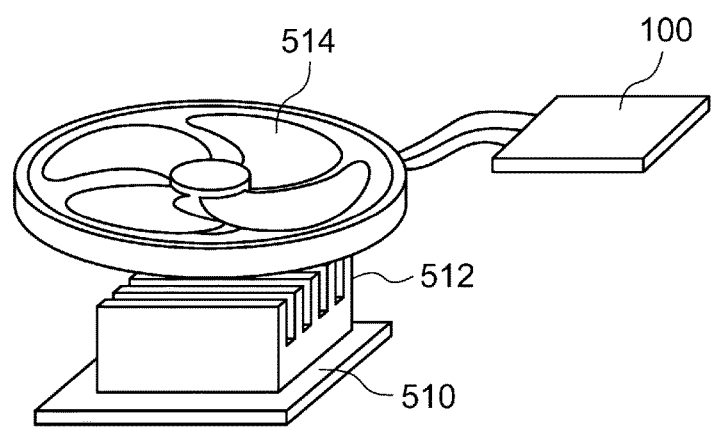

Lastly, description will be made regarding the usage of the driving circuit 100. The driving circuit 100 can be mounted together with the motor 2 on various kinds of electronic devices 500. FIGS. 7A and 7B are diagrams each showing an example of the electronic device 500. The electronic device 500 shown in FIG. 7A is configured as a storage apparatus 500a such as an optical disk drive, a hard disk drive (HDD), or the like. The storage apparatus 500a includes a storage medium 502 such as an optical disk, a magnetic disk, or the like, a spindle motor 504 that rotationally drives the storage medium 502, and the driving circuit 100 that drives the spindle motor 504. In addition to such components, the storage apparatus 500a may further include a pickup head, a lens, an actuator that drives such a pickup head or lens, and the like.

The electronic device 500 shown in FIG. 7B is configured as an electronic data processing device 500b such as a computer or the like. The electronic data processing device 500b includes a processor 510 such as a CPU (Central Processing Unit), GPU (Graphics Processing Unit), or the like, a heatsink 512 mounted on the processor 510, a fan motor 514 arranged such that it faces the heatsink 512, and the driving circuit 100 that drives the fan motor 514.

In addition, the driving circuit 100 is applicable to various kinds of electronic devices mounting such a brushless DC motor having a permanent magnet. For example, the driving circuit 100 is also applicable to office automation equipment and industrial equipment.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Description has been made in the embodiment mainly regarding the three-phase motor. In the present invention, the number of phases of the motor is not restricted in particular.

Second Modification

The driving circuit 100 may include nonvolatile memory that holds the generated parameter S4 in a nonvolatile manner.

Third Modification

The automatic parameter generating circuit 110 shown in FIG. 3 may further include an A/D converter that converts the current detection signal $V_{IS}$ into a digital value. Such an arrangement may perform digital signal processing so as to perform an operation that is equivalent to the operation of the automatic parameter generating circuit 110 shown in FIG. 3.

Fourth Modification

Description has been made in the embodiment regarding an arrangement in which a common parameter (threshold $I_P$) is employed for all of the U-phase, V-phase, and W-phase. Also, different thresholds $I_{PU}$, $I_{PV}$, and $I_{PW}$ may be determined for the U-phase, V-phase, and W-phase, respectively. That is to say, the thresholds $I_{PU}$, $I_{PV}$, and $I_{PW}$ may be respectively determined for the U-V electrode pair, the V-W electrode pair, and the W-U electrode pair, such that they each provide a maximum difference time period $\Delta\tau$ ($=\tau_+ - \tau_-$).

While the preferred embodiments of the present invention have been described using specific terms, such description is for illustrative purposes only, and it is to be understood that changes and variations may be made without departing from the spirit or scope of the appended claims.

What is claimed is:

1. A driving circuit for a brushless DC motor, comprising:
a driving signal generating circuit structured to generate a driving signal for each phase;
a driving stage structured to drive the brushless DC motor according to the respective phase driving signals;
an initial position detection circuit structured to detect an initial position of a rotor using an inductive sensing method when the brushless DC motor is started up; and
an automatic parameter generating circuit structured to determine a parameter to be used by the initial position detection circuit,
wherein the automatic parameter generating circuit is structured to measure, while a threshold value used in the measurement is changed, for each threshold value:
(i) a first time period up to a time point at which a magnitude of a coil current reaches the threshold value which is an absolute value of a positive threshold current after the driving stage applies a first polarity voltage across a pair of electrodes of the brushless DC motor; and (ii) a second time period up to a time point at which a magnitude of the coil current reaches the threshold value which is the absolute value of a negative threshold current after the driving stage applies a second polarity voltage across the pair of electrodes,
and wherein the automatic parameter generating circuit holds the threshold value that provides a maximum difference between the first time period and the second time period, which is to be used as the parameter by the initial position detection circuit, among a U-phase difference, a V-phase difference and a W-phase difference between the first time period and the second time period obtained in a repetitive calculation loop.

2. The driving circuit according to claim 1, wherein the automatic parameter generating circuit is structured to determine, based on the threshold value thus held as the parameter, a standby time period, to be provided from a time point at which the first polarity voltage is generated up to a time point at which the second polarity voltage is generated, which is used when the initial position detection circuit detects the initial position of the rotor,
and wherein the automatic parameter generating circuit is structured to hold the standby time period that corresponds to the threshold value thus held as the parameter to the initial position detection circuit.

3. The driving circuit according to claim 1, wherein the automatic parameter generating circuit is structured to switch the electrode pair of the brushless DC motor at least twice.

4. The driving circuit according to claim 1, wherein the brushless DC motor is structured as a three-phase motor,
and wherein the automatic parameter generating circuit is structured to switch the electrode pair of the brushless DC motor among three pairs, i.e., a U-V electrode pair, a V-W electrode pair, and a W-U electrode pair.

5. The driving circuit according to claim 1, monolithically integrated on a single semiconductor integrated circuit.

6. An electronic device comprising:
a brushless DC motor; and
the driving circuit according to claim 1, structured to drive the brushless DC motor.

7. A driving circuit for a brushless DC motor, comprising:
a driving signal generating circuit structured to generate a driving signal for each phase;
a driving stage structured to drive the brushless DC motor according to the respective phase driving signals;
an initial position detection circuit structured to detect an initial position of a rotor using an inductive sensing method when the brushless DC motor is started up; and
an automatic parameter generating circuit structured to determine a parameter to be used by the initial position detection circuit,
wherein the automatic parameter generating circuit is structured to measure, while a threshold value used in the measurement is changed, for each threshold value:
(i) a first time period up to a time point at which a magnitude of a coil current reaches the threshold value which is an absolute value of a positive threshold current after the driving stage applies a first polarity voltage across a pair of electrodes of the brushless DC motor; and (ii) a second time period up to a time point at which a magnitude of the coil current reaches the threshold value which is the absolute value of a negative threshold current after the driving stage applies a second polarity voltage across the pair of electrodes of the brushless DC motor, and wherein, when a difference between the first time period and the second time period exceeds a predetermined value, the automatic parameter generating circuit holds the threshold value in this stage as the parameter to be used by the initial position detection circuit.

8. The driving circuit according to claim 7, wherein the automatic parameter generating circuit changes the threshold value from a minimum value toward a maximum value.

9. The driving circuit according to claim 7, wherein the automatic parameter generating circuit is structured to determine, based on the threshold value thus held as the parameter to the initial position detection circuit, a standby time period, to be provided from a time point at which the first polarity voltage is generated up to a time point at which the second polarity voltage is generated, which is used when the initial position detection circuit detects the initial position of the rotor, and wherein the automatic parameter generating circuit is structured to hold the standby time period that corresponds to the threshold value thus held as the parameter.

10. The driving circuit according to claim 7, wherein the automatic parameter generating circuit is structured to switch the electrode pair of the brushless DC motor at least twice.

11. The driving circuit according to claim 7, wherein the brushless DC motor is structured as a three-phase motor, and wherein the automatic parameter generating circuit is structured to switch the electrode pair of the brushless DC motor among three pairs, i.e., a U-V electrode pair, a V-W electrode pair, and a W-U electrode pair.

12. The driving circuit according to claim 7, monolithically integrated on a single semiconductor integrated circuit.

13. An electronic device comprising:
a brushless DC motor; and
the driving circuit according to claim 7, structured to drive the brushless DC motor.

14. A method for generating a parameter to be used to detect an initial position of a rotor of a brushless DC motor using an inductive sensing method, the method comprising:
measuring, while a threshold value used in the measurement is changed, a first time period and a second time period for each threshold value;
holding, as a parameter, the threshold value that provides a maximum difference between the first time period and the second time period among a U-phase difference, a V-phase difference and a W-phase difference between the first time period and the second time period obtained in a repetitive calculation loop,
wherein (i) the first time period is a period of time up to a time point at which a magnitude of a coil current reaches the threshold value which is an absolute value of a positive threshold current after a first polarity voltage is applied across a pair of electrodes of the brushless DC motor,
and wherein (ii) the second time period is a period of time up to a time point at which a magnitude of the coil current reaches the threshold value which is the absolute value of a negative threshold current after a second polarity voltage is applied across the pair of electrodes.

15. The method according to claim 14, wherein a standby time period is determined, based on the threshold value thus held as the parameter to the initial position detection circuit, as a period of time from a time point at which the first polarity voltage is generated up to a time point at which the second polarity voltage is generated, which is used when the initial position of the rotor is detected,
and wherein the standby time period corresponds to the threshold value thus held as the parameter.

16. The method according to claim 14, wherein, in measuring the first time period and the second time period, the electrode pair of the brushless DC motor is switched at least twice.

17. A method for generating a parameter to be used to detect an initial position of a rotor of a brushless DC motor using an inductive sensing method, the method comprising:
measuring, while a threshold value used in the measurement is changed, a first time period and a second time period for each threshold value;
holding the threshold value as a parameter when a difference between the first time period and the second time period reaches a predetermined value,
wherein (i) the first time period is a period of time up to a time point at which a magnitude of a coil current reaches the threshold value which is an absolute value of a positive threshold current after a first polarity voltage is applied across a pair of electrodes of the brushless DC motor,
and wherein (ii) the second time period is a period of time up to a time point at which a magnitude of the coil current reaches the threshold value which is the absolute value of a negative threshold current after a second polarity voltage is applied across the pair of electrodes.

18. The method according to claim 17, wherein the threshold value is changed from a predetermined minimum value toward a maximum value.

19. The method according to claim 17, wherein a standby time period is determined, based on the threshold value thus held as the parameter, as a period of time from a time point at which the first polarity voltage is generated up to a time point at which the second polarity voltage is generated, which is used when the initial position of the rotor is detected,
and wherein the standby time period corresponds to the threshold value thus held as the parameter.

20. The method according to claim 17, wherein, in measuring the first time period and the second time period, the electrode pair of the brushless DC motor is switched at least twice.

* * * * *